(12) United States Patent
Homme et al.

(10) Patent No.: US 7,112,801 B2
(45) Date of Patent: Sep. 26, 2006

(54) SCINTILLATOR PANEL AND RADIATION IMAGE SENSOR

(75) Inventors: Takuya Homme, Hamamatsu (JP); Toshio Takabayashi, Hamamatsu (JP); Hiroto Sato, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 249 days.

(21) Appl. No.: 10/629,820

(22) Filed: Jul. 30, 2003

(65) Prior Publication Data

US 2005/0077473 A1 Apr. 14, 2005

Related U.S. Application Data

(63) Continuation of application No. 10/225,416, filed on Aug. 22, 2002, now Pat. No. 6,849,336, which is a continuation-in-part of application No. 09/560,911, filed on Apr. 28, 2000, now Pat. No. 6,531,225, which is a continuation-in-part of application No. PCT/JP99/01911, filed on Apr. 9, 1999.

(30) Foreign Application Priority Data

Jun. 18, 1998 (JP) .................................. 11-171190
Jun. 18, 1998 (JP) .................................. 11-171191

(51) Int. Cl.
*G01T 1/24* (2006.01)
(52) U.S. Cl. ............................. 250/370.11; 250/370.01; 250/483.1
(58) Field of Classification Search ........... 250/370.11, 250/484.4
See application file for complete search history.

(56) References Cited

U.S. PATENT DOCUMENTS

| | | | | |
|---|---|---|---|---|
| 3,936,645 A | * | 2/1976 | Iversen | 250/370.11 |
| 4,547,670 A | | 10/1985 | Sugimoto et al. | 250/370 |
| 4,825,085 A | * | 4/1989 | Tsuchino et al. | 250/484.4 |
| 5,041,729 A | | 8/1991 | Takahashi et al. | 250/370.11 |
| 5,132,539 A | | 7/1992 | Kwasnick et al. | 250/361 |
| 5,153,438 A | | 10/1992 | Kingsley et al. | 250/370.09 |
| 5,179,284 A | | 1/1993 | Kingsley et al. | 250/370.11 |
| 5,187,369 A | | 2/1993 | Kingsley et al. | 250/370.11 |
| 5,227,635 A | | 7/1993 | Iwanczyk | 250/370.12 |
| 5,310,784 A | * | 5/1994 | Ide et al. | 524/876 |
| 5,585,638 A | | 12/1996 | Hoffman | 250/370.07 |
| 5,654,084 A | * | 8/1997 | Egert | 428/215 |
| 5,848,124 A | | 12/1998 | Inazuru | 378/140 |
| 5,852,303 A | * | 12/1998 | Cuomo et al. | 257/9 |
| 5,860,584 A | | 1/1999 | Inazuru | 228/121 |
| 5,864,146 A | * | 1/1999 | Karellas | 250/581 |
| 6,025,598 A | | 2/2000 | Tago | 250/370.1 |
| 6,429,437 B1 | | 8/2002 | Laugier | 250/370.11 |
| 6,531,225 B1 | | 3/2003 | Homme et al. | 428/408 |
| 6,777,690 B1 | * | 8/2004 | Homme et al. | 250/483.1 |

FOREIGN PATENT DOCUMENTS

| | | |
|---|---|---|
| EP | 0 403 802 | 12/1990 |
| EP | 0 528 676 | 2/1993 |
| JP | 63-215987 | 9/1988 |
| JP | 63-216000 | 9/1988 |
| JP | 01-116480 | 5/1989 |

(Continued)

*Primary Examiner*—Albert Gagliardi
(74) *Attorney, Agent, or Firm*—Drinker Biddle & Reath LLP

(57) ABSTRACT

The surfaces of an amorphous carbon substrate of a scintillator panel have undergone sandblasting, and an Al film 1 serving as a reflecting film is formed on one surface, and a columnar scintillator for converting incident radiation into visible light is formed on the surface of the Al film.

28 Claims, 10 Drawing Sheets

FOREIGN PATENT DOCUMENTS

| | | |
|---|---|---|
| JP | 1-267500 | 10/1989 |
| JP | 3-163391 | 7/1991 |
| JP | 3-3163391 | 7/1991 |
| JP | 04-174400 | 6/1992 |
| JP | 5-60871 | 3/1993 |
| JP | 5-93780 | 4/1993 |
| JP | 5-39558 | 6/1993 |
| JP | 5-188148 | 7/1993 |
| JP | 05-189757 | 7/1993 |
| JP | 5-203755 | 8/1993 |
| JP | 5-299044 | 11/1993 |
| JP | 7-21560 | 3/1995 |
| JP | 7-218698 | 8/1995 |
| JP | 7-270599 | 10/1995 |
| JP | 8-198687 | 8/1996 |
| JP | 08-329465 | 12/1996 |
| JP | 9-257947 | 10/1997 |
| WO | WO98/36290 | 8/1998 |
| WO | WO98/36291 | 8/1998 |
| WO | WO99/38031 | 7/1999 |

\* cited by examiner

Fig.10

| | TUBE VOLTAGE Kv | INDUSTRIAL HALF-WAVE RECTIFYING X-RAY TUBE | | |
|---|---|---|---|---|
| | | 40 | 50 | 60 |
| PRIOR ART | SUBSTRATE=Al 1mm | 100% | 100% | 100% |
| FIRST EMBODIMENT | SUBSTRATE=a-C 1mm +Al FILM | 260% | 230% | 220% |
| SECOND EMBODIMENT | SUBSTRATE=a-C 1mm +Al FILM+LiF FILM | 300% | 270% | 260% |
| THIRD EMBODIMENT | SUBSTRATE=a-C 1mm +LiF FILM | 220% | 200% | 190% |
| FOURTH EMBODIMENT | SUBSTRATE=a-C 1mm | 150% | 135% | 130% |

SCINTILLATOR PANEL AND RADIATION IMAGE SENSOR

RELATED APPLICATION

This is a Continuation-In-Part application of U.S. application Ser. No. 10/225,416 filed on Aug. 22, 2002, which issued on Feb. 1, 2005 as U.S. Pat. No. 6,849,336, which is a continuation application of Ser. No. 09/560,911 filed on Apr. 28, 2000, which issued on Mar. 11, 2003 as U.S. Pat. No. 6,531,225, which is a Continuation-In-Part application of International Patent application serial No. PCT/JP99/01911 filed on Apr. 9, 1999.

BACKGROUND OF THE INVENTION

1. Field of the Invention

The present invention relates to a scintillator panel and radiation image sensor used for medical X-ray photography and the like.

2. Related Background Art

Conventionally, X-ray photosensitive films have been used for medical and industrial X-ray photography. However, radiation imaging systems using radiation detectors have come into widespread use owing to advantages in convenience and retention of photographic results. In such a radiation imaging system, pixel data based on 2D radiation is acquired as an electrical signal by the radiation detector, and the signal is processed by the processor and displayed on the monitor.

As a conventional, typical radiation detector, a radiation detector having a structure in which an image sensing element is stuck to a scintillator panel having a scintillator formed on a substrate made of aluminum, glass, molten quartz, or the like is available. In this radiation detector, the scintillator converts radiations incident from the substrate side into light, and the image sensing element detects the light (see Japanese Patent Publication No. 7-21560).

A radiation detector for medical purposes, especially for dental examination, uses low-energy X-rays. If, therefore, an aluminum substrate is used, quite a few X-ray components are absorbed by the substrate. In a radiation detector using low-energy X-rays, therefore, the substrate of the scintillator panel is required to have high radiation transmittance.

It is an object of the present invention to provide a scintillator panel which increases the optical output by using a substrate having high radiation transmittance for the scintillator panel, and a radiation image sensor using the scintillator panel.

SUMMARY OF THE INVENTION

A scintillator panel of the present invention is characterized by comprising a substrate made of carbon as a major constituent, a reflecting film formed on said substrate, a scintillator deposited on said reflecting film, a protective film covering said substrate and said scintillator.

According to this scintillator panel, since the substrate made of carbon as a major constituent has high radiation transmittance, the amount of radiation absorbed by the substrate can be decreased, and the amount of radiation reaching the scintillator can be increased.

A radiation image sensor according to the present invention is characterized by having an image sensing element placed to oppose the scintillator of the scintillator panel comprising a substrate made of carbon as a major constituent, a scintillator deposited on the substrate, and a protective film covering the scintillator.

According to this radiation image sensor, since the scintillator panel has the substrate made of carbon as a major constituent having high radiation transmittance, the amount of light reaching the image sensing element can be increased.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 10 is a view showing outputs from the radiation image sensors according to the first to fourth embodiments in comparison with outputs from the conventional radiation image sensor;

FIGS. 11 and 12 shows another modified scintillator panel before covering by protective film according to present invention, wherein FIG. 11 is a front view and FIG. 12 is a sectional view;

FIGS. 14 and 15 shows another modified scintillator panel before covering by protective film according to present invention, wherein FIG. 14 is a front view and FIG. 15 is a sectional view; and FIGS. 16 and 17 shows another modified scintillator panel before covering by protective film according to present invention, wherein FIG. 16 is a front view and FIG. 17 is a partial sectional view.

DESCRIPTION OF THE PREFERRED EMBODIMENTS

Figure 1:
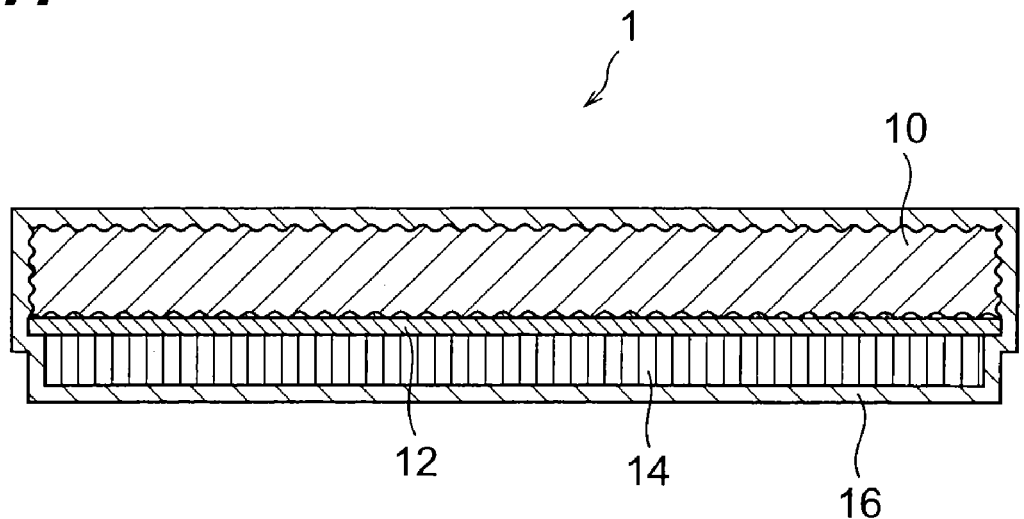
FIG. 1 is a sectional view of a scintillator panel according to the first embodiment.
Figure 2:
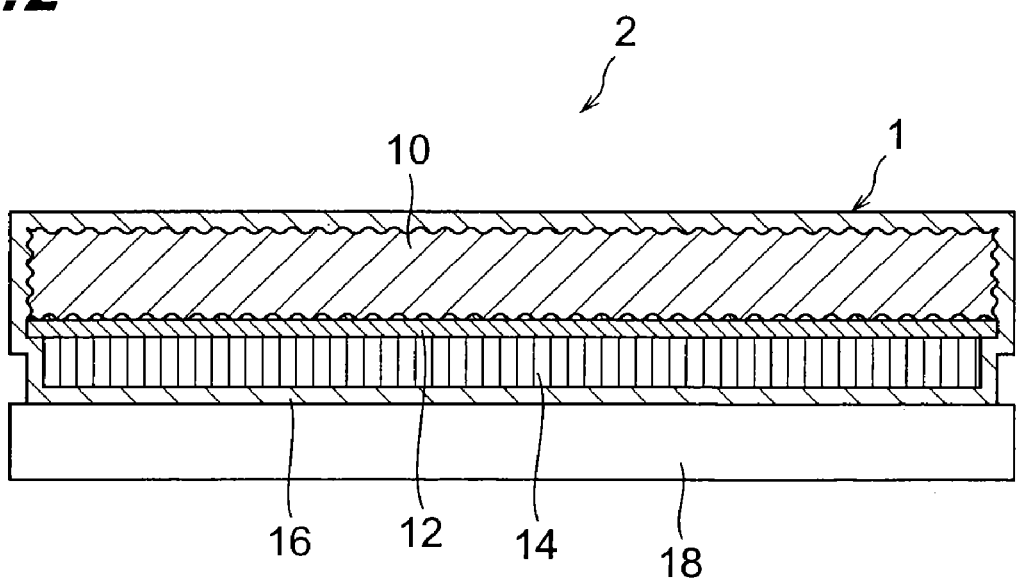
FIG. 2 is a sectional view of a radiation image sensor according to the first embodiment.

The first embodiment of the present invention will be described below with reference to FIGS. 1, 2, and 3A to 3D. FIG. 1 is a sectional view of a scintillator panel 1. FIG. 2 is a sectional view of a radiation image sensor 2.

As shown in FIG. 1, the surfaces of an amorphous carbon (a-C) (glassy carbon or glass-like carbon) substrate 10 have undergone sandblasting, and an Al film 12 serving as a reflecting film is formed on one surface. A columnar scintillator 14 for converting incident radiation into visible light is formed on the surface of the Al film 12. Note that Tl-doped CsI is used for the scintillator 14. The scintillator 14 is covered with a polyparaxylylene film 16, together with the substrate 10.

As shown in FIG. 2, the radiation image sensor 2 has a structure in which an image sensing element 18 is stuck to the distal end side of the scintillator 14.

The steps in manufacturing the scintillator panel 1 will be described next with reference to FIGS. 3A to 3D. Sandblasting is performed on the surfaces of the rectangular or circular a-C substrate 10 (thickness: 1 mm) by using glass beads (#800). Fine projections/recesses are formed on the surfaces of the substrate 10 by this sandblasting (see FIG. 3A).

Figure 3A:
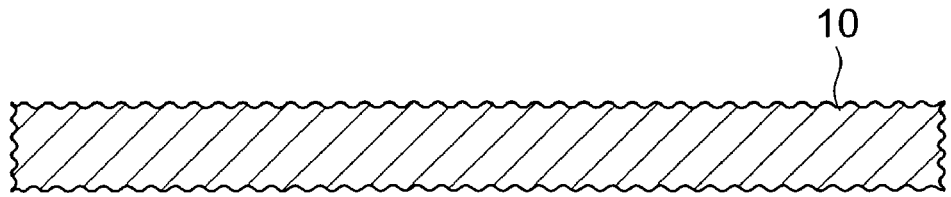
FIG. 3A is a view showing the step in manufacturing the scintillator panel according to the first embodiment.
Figure 3B:
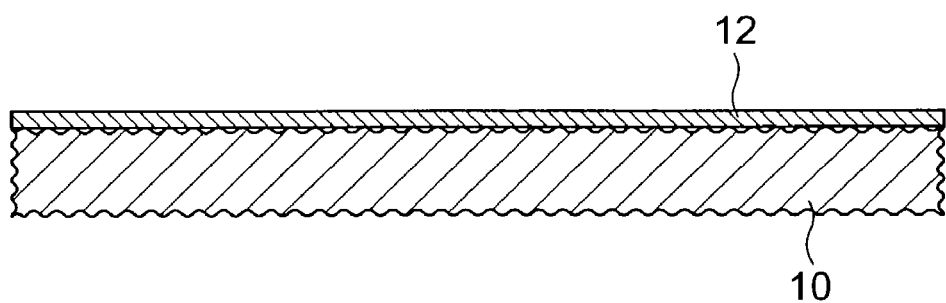
FIG. 3B is a view showing the step in manufacturing the scintillator panel according to the first embodiment.
Figure 3C:
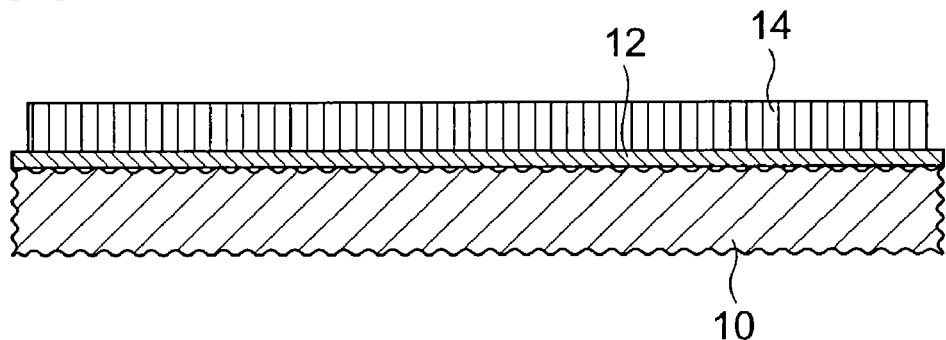
FIG. 3C is a view showing the step in manufacturing the scintillator panel according to the first embodiment.
Figure 3D:
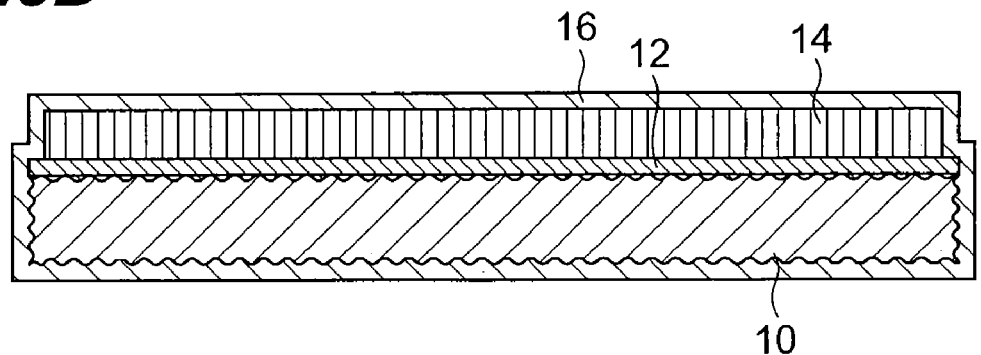
FIG. 3D is a view showing the step in manufacturing the scintillator panel according to the first embodiment.

The Al film 12 serving as a reflecting film is then formed on one surface of the substrate 10 to a thickness of 100 nm by vacuum vapor deposition (see FIG. 3B). A Tl-doped columnar CsI crystal is grown on the surface of the Al film 12 by vapor deposition to form the scintillator 14 having a thickness of 250 μm (see FIG. 3C).

CsI used to form this scintillator 14 has high hygroscopicity, and hence absorbs water vapor from the air and deliquesces if it is kept exposed to the air. In order to prevent this, the polyparaxylylene film 16 is formed by the CVD method. More specifically, the substrate 10 on which the scintillator 14 is formed is placed in a CVD apparatus, and the polyparaxylylene film 16 is formed to a thickness of 10 μm. With this process, the polyparaxylylene film 16 is formed on the entire surfaces of the scintillator 14 and substrate 10 (see FIG. 3D). Since the polyparaxylylene film 16 is formed on the surfaces of the substrate 10, the moisture-proof characteristics of the scintillator 14 can be improved. In addition, since the polyparaxylylene film 16 is formed on the entire surfaces of the substrate 10, the moisture-proof characteristics of the scintillator 14 can be further improved.

Note that the formation of the fine projections/recesses on the surfaces of the substrate 10 by sandblasting can improve the adhesion characteristics between the polyparaxylylene film 16 and the substrate 10, thus preventing peeling of the polyparaxylylene film 16.

The radiation image sensor 2 is manufactured by sticking the image sensing element (CCD) 18 to the distal end portion side of the scintillator 14 of the completed scintillator panel 1 such that the light-receiving portion opposes the distal end portion side (see FIG. 2).

According to the radiation image sensor 2 of this embodiment, radiation incident from the substrate 10 side is converted into light by the scintillator 14 and detected by the image sensing element 18. In this case, since a-C substrate 10 has high radiation transmittance, the amount of radiation absorbed by the substrate 10 can be reduced. Hence, the amount of radiation reaching the scintillator 14 can be increased. In addition, since the Al film 12 as a reflecting film is formed, light incident on the light-receiving portion of the image sensing element 18 can be increased. This makes it possible to sharpen the image detected by the radiation image sensor.

FIG. 10 shows outputs from the radiation image sensor 2 which are obtained when the radiation image sensor 2 detects the X-rays generated by applying 40 kV, 50 kV, and 60 kV as tube voltages to the half-wave rectifying X-ray tube, in comparison with outputs from the conventional radiation image sensor. More specifically, if the output obtained when the conventional radiation image sensor detects the X-ray generated by applying 40 kV as a tube voltage to the half-wave rectifying X-ray tube is assumed to be 100%, the output obtained when the X-ray is detected by the radiation image sensor 2 is 260%. If the output obtained when the conventional radiation image sensor detects the X-ray generated by applying 50 kV as a tube voltage to the half-wave rectifying X-ray tube is assumed to be 100%, the output obtained when the X-ray is detected by the radiation image sensor 2 is 230%. If the output obtained when the conventional radiation image sensor detects the X-ray generated by applying 60 kV as a tube voltage to the half-wave rectifying X-ray tube is assumed to be 100%, the output obtained when the X-ray is detected by the radiation image sensor 2 is 220%.

The second embodiment of the present invention will be described next. Note that the same reference numerals denoting the parts of the scintillator panel 1 and radiation image sensor 2 as in the first embodiment denote the same parts in the second embodiment.

Figure 4:
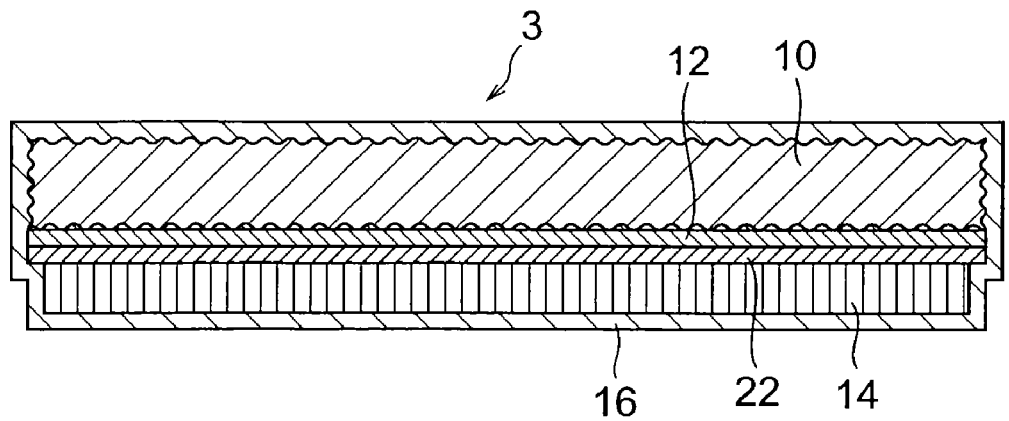
FIG. 4 is a sectional view of a scintillator panel according to the second embodiment.
Figure 5:
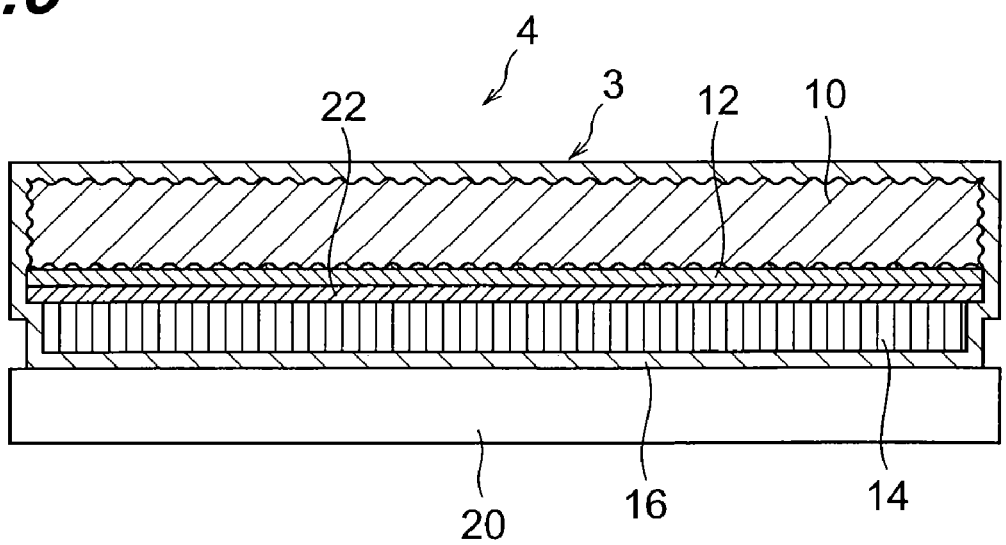
FIG. 5 is a sectional view of a radiation image sensor according to the second embodiment.

FIG. 4 is a sectional view of a scintillator panel 3. FIG. 5 is a sectional view of a radiation image sensor 4. As shown in FIG. 4, the surfaces of a-C substrate 10 of the scintillator panel 3 have undergone sandblasting, and an Al film 12 serving as a reflecting film is formed on one surface. As a low-refractive-index member, an LiF film (thin transparent film) 22 having a refractive index (refractive index=1.3) lower than that of a scintillator 14 is formed on the Al film 12. The columnar scintillator 14 for converting incident radiation into visible light is formed on the surface of the LiF film 22. Note that Tl-doped CsI (refractive index=1.8) is used for the scintillator 14. The scintillator 14 is covered with a polyparaxylylene film 16, together with the substrate 10.

As shown in FIG. 5, the radiation image sensor 4 has a structure in which an image sensing element 18 is stuck to the scintillator 14 side of the scintillator panel 3.

The steps in manufacturing the scintillator panel 3 will be described next. First of all, sandblasting is performed on the surfaces of the rectangular or circular a-C substrate 10 (thickness: 1 mm) by using glass beads (#800), thereby forming fine projections/recesses on the surfaces of the substrate 10.

The Al film 12 serving as a reflecting film is then formed on one surface of the substrate 10 to a thickness of 100 nm by vacuum vapor deposition, and the LiF film 22 as a low-refractive-index member is formed on the Al film 12 to a thickness of 100 nm by vacuum vapor deposition. A Tl-doped columnar CsI crystal is grown on the surface of the LiF film 22 by vapor deposition to form the scintillator 14 having a thickness of 250 μm. The polyparaxylylene film 16 is formed to a thickness of 10 μm by the CVD method. With this process, the polyparaxylylene film 16 is formed on the entire surfaces of the scintillator 14 and substrate 10. Since the polyparaxylylene film 16 is formed on the surfaces of the substrate 10, the moisture-proof characteristics of the scintillator 14 can be improved. In addition, since the polyparaxylylene film 16 is formed on the entire surfaces of the substrate 10, the moisture-proof characteristics of the scintillator 14 can be further improved.

The radiation image sensor 4 is manufactured by sticking the image sensing element (CCD) 18 to the distal end portion of the scintillator 14 of the completed scintillator panel 3 such that the light-receiving portion opposes the distal end portion (see FIG. 5).

According to the radiation image sensor 4 of this embodiment, radiation incident from the substrate 10 side is converted into light by the scintillator 14 and detected by the image sensing element 18. In this case, since a-C substrate 10 has high radiation transmittance, the amount of radiation absorbed by the substrate 10 can be reduced. Hence, the amount of radiation reaching the scintillator 14 can be increased. In addition, since the Al film 12 as a reflecting film and the LiF film 22 as a low-refractive-index member are formed, light incident on the light-receiving portion of the image sensing element 18 can be increased. This makes it possible to sharpen the image detected by the radiation image sensor.

As shown in FIG. 10, if the output obtained when the conventional radiation image sensor detects the X-ray generated by applying 40 kv as a tube voltage to the half-wave rectifying X-ray tube is assumed to be 100%, the output obtained when the X-ray is detected by the radiation image sensor 4 is 300%. If the output obtained when the conventional radiation image sensor detects the X-ray generated by applying 50 kV as a tube voltage to the half-wave rectifying X-ray tube is assumed to be 100%, the output obtained when the X-ray is detected by the radiation image sensor 4 is 270%. If the output obtained when the conventional radiation image sensor detects the X-ray generated by applying 60 kV as a tube voltage to the half-wave rectifying X-ray tube is assumed to be 100%, the output obtained when the X-ray is detected by the radiation image sensor 4 is 260%.

The third embodiment of the present invention will be described next. Note that the same reference numerals denoting the parts of the scintillator panels 1 and 3 and radiation image sensors 2 and 4 as in the first and second embodiments denote the same parts in the third embodiment.

Figure 6:
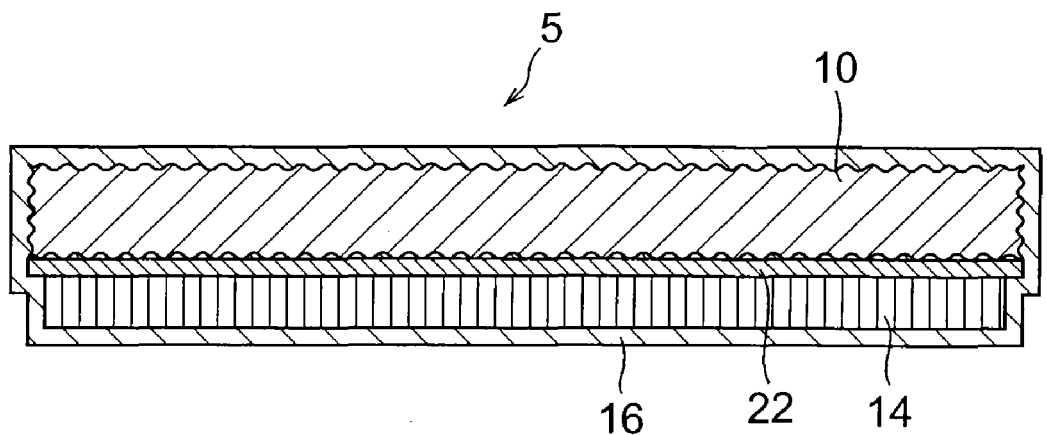
FIG. 6 is a sectional view of a scintillator panel according to the third embodiment.
Figure 7:
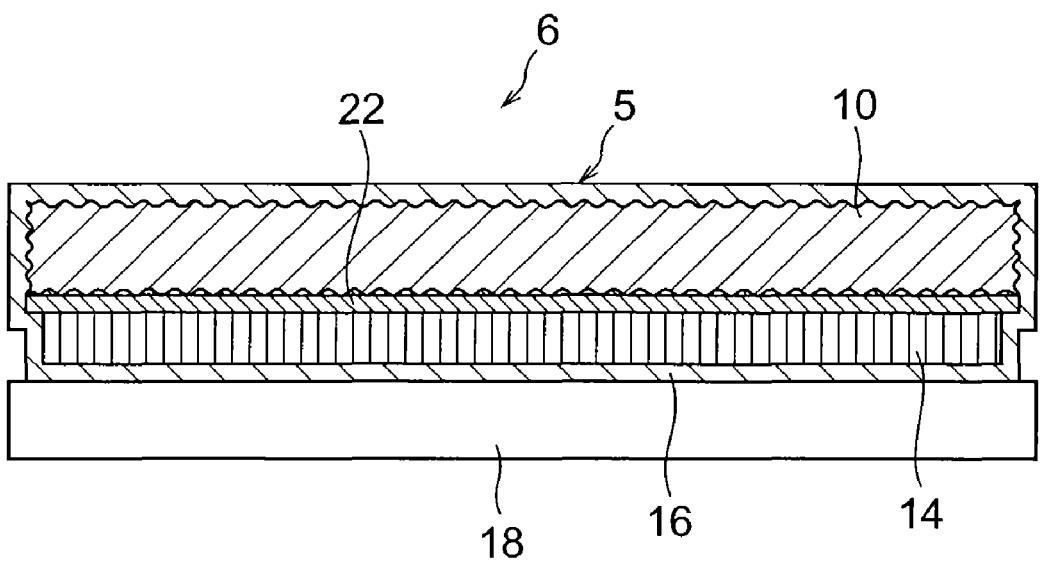
FIG. 7 is a sectional view of a radiation image sensor according to the third embodiment.

FIG. 6 is a sectional view of a scintillator panel 5. FIG. 7 is a sectional view of a radiation image sensor 6. As shown in FIG. 6, the surfaces of a-C substrate 10 of the scintillator panel 3 have undergone sandblasting, and an LiF film (thin transparent film) 22 is formed on one surface. A columnar scintillator 14 for converting incident radiation into visible light is formed on the surface of the LiF film 22. Note that Tl-doped CsI is used for the scintillator 14. The scintillator 14 is covered with a polyparaxylylene film 16, together with the substrate 10.

As shown in FIG. 7, the radiation image sensor 6 has a structure in which an image sensing element 18 is stuck to the distal end portion side of the scintillator 14 of the scintillator panel 5.

The steps in manufacturing the scintillator panel 5 will be described next. First of all, sandblasting is performed on the surfaces of the rectangular or circular a-C substrate 10 (thickness: 1 mm) by using glass beads (#800), thereby forming fine projections/recesses on the surfaces of the substrate 10.

The LiF film 22 as a low-refractive-index member is then formed on one surface of the substrate 10 to a thickness of 100 nm by vacuum vapor deposition. A Tl-doped columnar CsI crystal is grown on the surface of the LiF film 22 by vapor deposition to form the scintillator 14 having a thickness of 250 μm. The polyparaxylylene film 16 is formed to a thickness of 10 μm by the CVD method. With this process, the polyparaxylylene film 16 is formed on the entire surfaces of the scintillator 14 and substrate 10. Since the polyparaxylylene film 16 is formed on the surfaces of the substrate 10, the moisture-proof characteristics of the scintillator 14 can be improved. In addition, since the polyparaxylylene film 16 is formed on the entire surfaces of the substrate 10, the moisture-proof characteristics of the scintillator 14 can be further improved.

The radiation image sensor 6 is manufactured by sticking the image sensing element (CCD) 18 to the distal end portion side of the scintillator 14 of the completed scintillator panel 5 such that the light-receiving portion opposes the distal end portion side (see FIG. 7).

According to the radiation image sensor 6 of this embodiment, radiation incident from the substrate 10 side is converted into light by the scintillator 14 and detected by the image sensing element 18. In this case, since a-C substrate 10 has high radiation transmittance, the amount of radiation absorbed by the substrate 10 can be reduced. Hence, the amount of radiation reaching the scintillator 14 can be increased. In addition, since the LiF film 22 is formed as a low-refractive-index member, light satisfying the total reflection condition is reflected by the interface between the scintillator 14 and the LiF film 22, and the amount of light incident on the light-receiving portion of the image sensing element 18 can be increased. This makes it possible to sharpen the image detected by the radiation image sensor.

As shown in FIG. 10, if the output obtained when the conventional radiation image sensor detects the X-ray generated by applying 40 kV as a tube voltage to the half-wave rectifying X-ray tube is assumed to be 100%, the output obtained when the X-ray is detected by the radiation image sensor 6 is 220%. If the output obtained when the conventional radiation image sensor detects the X-ray generated by applying 50 kV as a tube voltage to the half-wave rectifying X-ray tube is assumed to be 100%, the output obtained when the X-ray is detected by the radiation image sensor 6 is 200%. If the output obtained when the conventional radiation image sensor detects the X-ray generated by applying 60 kV as a tube voltage to the half-wave rectifying X-ray tube is assumed to be 100%, the output obtained when the X-ray is detected by the radiation image sensor 6 is 190%.

The fourth embodiment of the present invention will be described next. Note that the same reference numerals denoting the parts of the scintillator panel 1 and radiation image sensor 2 as in the first embodiment denote the same parts in the fourth embodiment.

Figure 8:
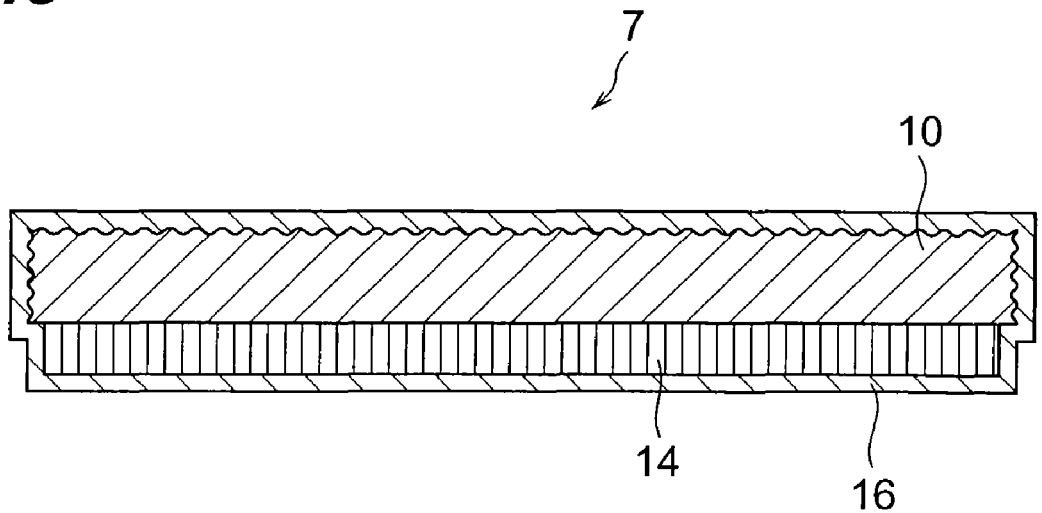
FIG. 8 is a sectional view of a scintillator panel according to the fourth embodiment.
Figure 9:
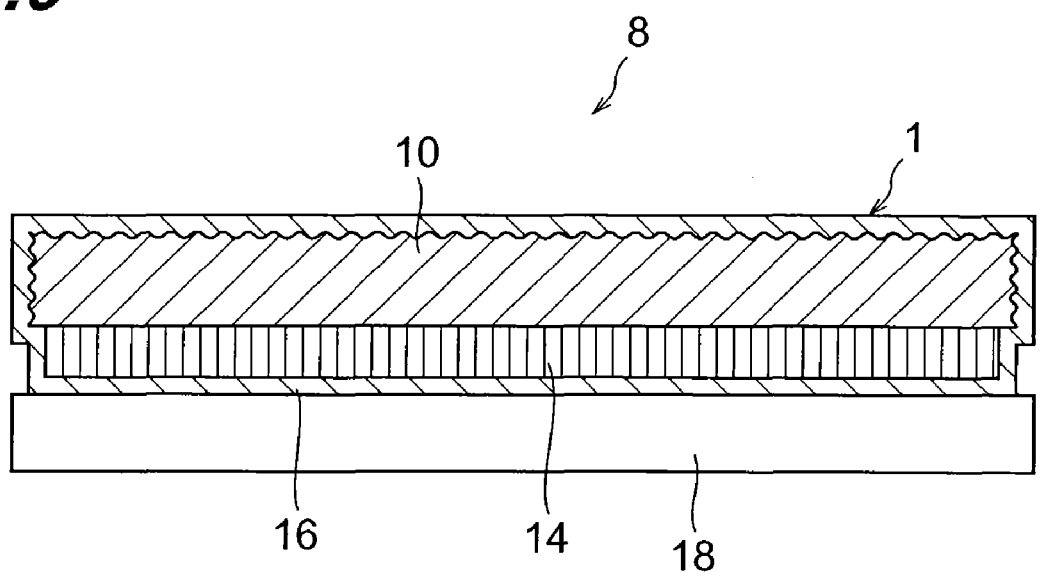
FIG. 9 is a sectional view of a radiation image sensor according to the fourth embodiment.

FIG. 8 is a sectional view of a scintillator panel 7. FIG. 9 is a sectional view of a radiation image sensor 8. As shown in FIG. 8, one surface and side surfaces of a-C substrate 10 of the scintillator panel 7 have undergone sandblasting, and the other surface is mirror-polished.

A columnar scintillator 14 for converting incident radiation into visible light is formed on the other surface of this substrate. Note that Tl-doped CsT is used for the scintillator 14. The scintillator 14 is covered with a polyparaxylylene film 16, together with the substrate 10.

As shown in FIG. 9, the radiation image sensor 8 has a structure in which an image sensing element 18 is stuck to the scintillator 14 side of the scintillator panel 7.

The steps in manufacturing the scintillator panel 7 will be described next. First of all, sandblasting is performed on the surfaces of the rectangular or circular a-C substrate 10

(thickness: 1 mm) by using glass beads (#800), thereby forming fine projections/recesses on the surfaces of the substrate 10. In addition, the other surface of the substrate 10 is mirror-polished.

A Tl-doped columnar CsI crystal is grown on the other surface of the substrate 10 by vapor deposition to form the scintillator 14 having a thickness of 250 μm. The polyparaxylylene film 16 is formed to a thickness of 10 μm by the CVD method. With this process, the polyparaxylylene film 16 is formed on the entire surfaces of the scintillator 14 and substrate 10. Since the polyparaxylylene film 16 is formed on the surfaces of the substrate 10, the moisture-proof characteristics of the scintillator 14 can be improved. In addition, since the polyparaxylylene film 16 is formed on the entire surfaces of the substrate 10, the moisture-proof characteristics of the scintillator 14 can be further improved.

The radiation image sensor 8 is manufactured by sticking the image sensing element (CCD) 18 to the distal end portion side of the scintillator 14 of the completed scintillator panel 7 such that the light-receiving portion opposes the distal end portion side (see FIG. 9).

According to the radiation image sensor 8 of this embodiment, radiation incident from the substrate 10 side is converted into light by the scintillator 14 and detected by the image sensing element 18. In this case, since a-C substrate 10 has high radiation transmittance, the amount of radiation absorbed by the substrate 10 can be reduced. Hence, the amount of radiation reaching the scintillator 14 can be increased. This can increase the amount of light incident on the light-receiving portion of the image sensing element 18, thereby sharpening the image detected by the radiation image sensor 8.

As shown in FIG. 10, if the output obtained when the conventional radiation image sensor detects the X-ray generated by applying 40 kV as a tube voltage to the half-wave rectifying X-ray tube is assumed to be 100%, the output obtained when the X-ray is detected by the radiation image sensor 8 is 150%. If the output obtained when the conventional radiation image sensor detects the X-ray generated by applying 50 kV as a tube voltage to the half-wave rectifying X-ray tube is assumed to be 100%, the output obtained when the X-ray is detected by the radiation image sensor 8 is 135%. If the output obtained when the conventional radiation image sensor detects the X-ray generated by applying 60 kV as a tube voltage to the half-wave rectifying X-ray tube is assumed to be 100%, the output obtained when the X-ray is detected by the radiation image sensor 8 is 130%.

Next, the other modified scintillator panels will be explained. All modified scintillator panels explained below are characterized in the placement of the scintillator on the substrate. Hereinafter, modified scintillator panel will be illustrated with the states before covering the protective films.

Figure 11:
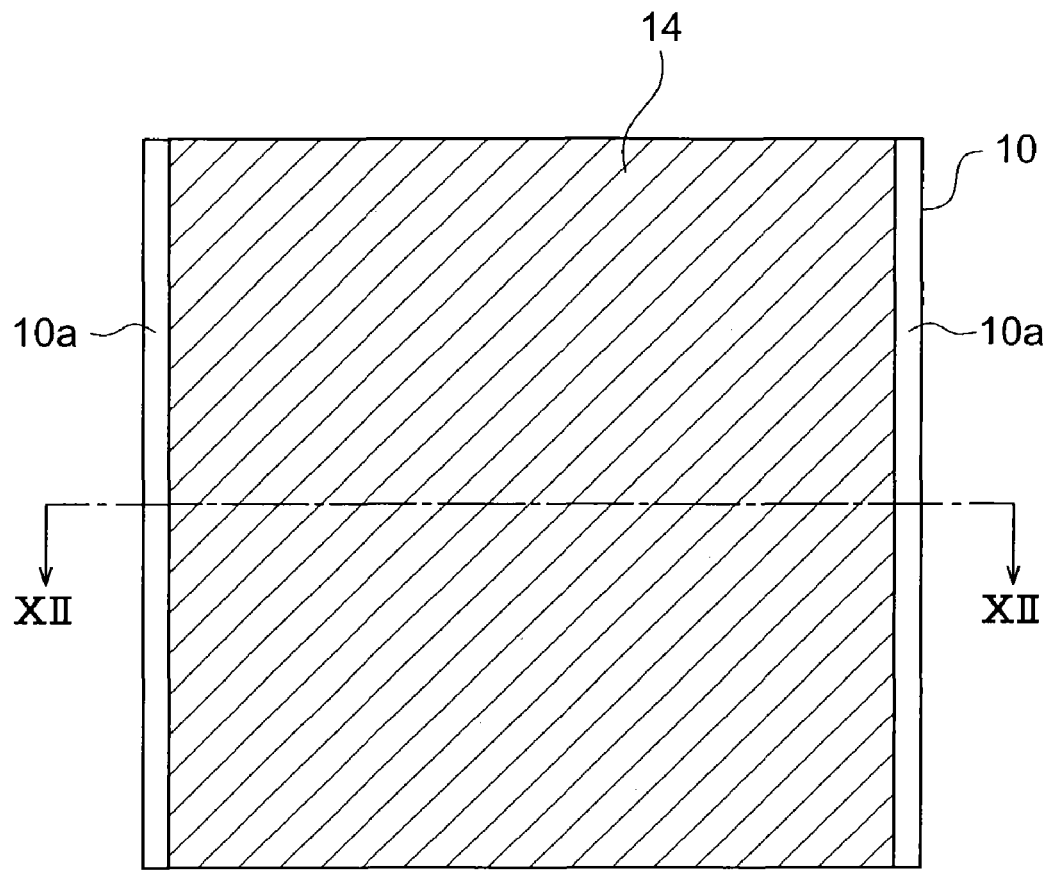
Figure 12:
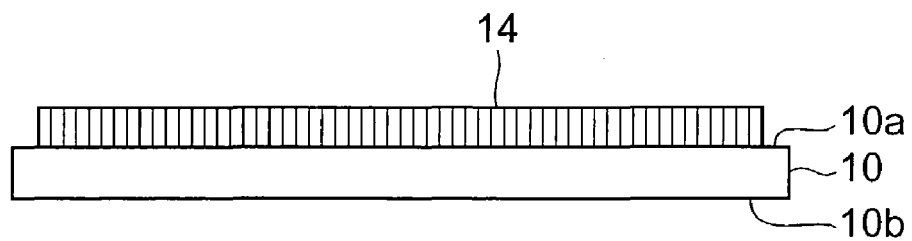
Figure 13:
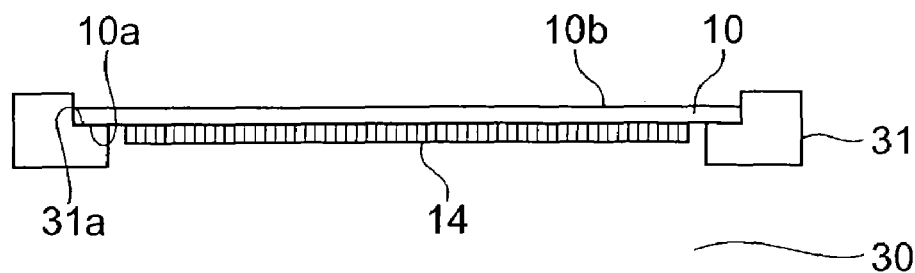
FIG. 13 shows a scintillator depositing process of the scintillator panel as shown in FIG. 11.

FIGS. 11 and 12 show a first modified scintillator panel according to the present invention. In this scintillator panel, the scintillator 14 deposited on the center region of the first surface 10a of the substrate 10. This scintillator deposited region is located between two strip regions exposing the first surface 10a of the substrate 10. These two strip regions extend along the opposite edges of the substrate 10 and is not covered by the scintillator 14. And the scintillator deposited region touches other two edges of the substrate 10.

When the scintillator 14 deposited on the substrate, the substrate 10 holds by a deposition holder 31 in deposition chamber 30. This deposition holder 31 has two cavity portion 31a and the substrate 10 is housed in this cavity portion 31a. Therefore, the scintillator 14 is not deposited on these two portion of the first surface 10a, these two portions remains exposed.

When the first surface 10a has 460 mm×460 mm area, the width of strip regions exposing the first surface 10a of the substrate 10 may be 2 mm.

Figure 14:
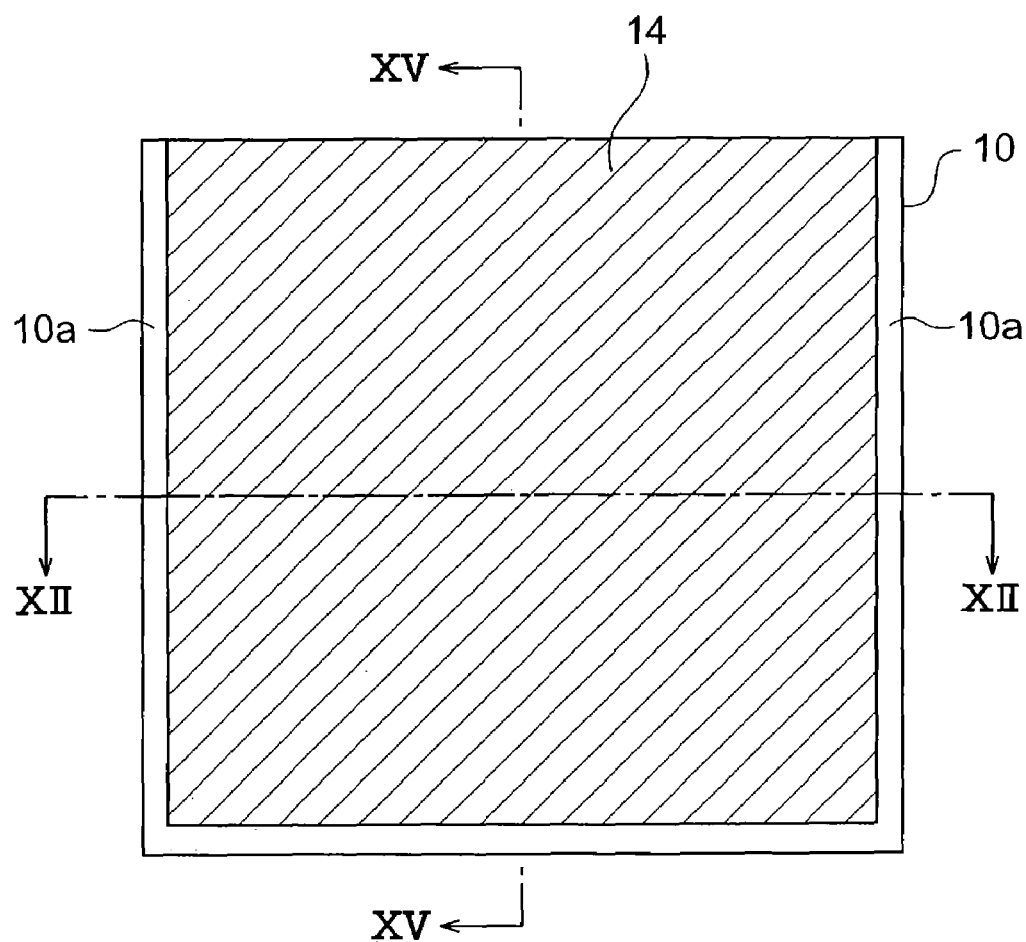
Figure 15:
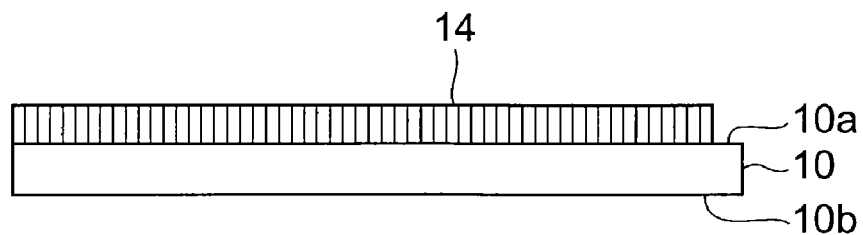

FIGS. 14 and 15 show a second modified scintillator panel according to the present invention. In this scintillator panel, the scintillator deposited region is surrounded by strip region exposing the first surface 10a of the substrate 10 on three sides. This strip region extend along the three successive edges of the substrate 10. And the scintillator deposited region touches other one edges of the substrate 10.

When the scintillator 14 is deposited on the substrate 10, this strip region is used to hold the substrate 10 by the deposition holder in deposition chamber.

Figure 16:
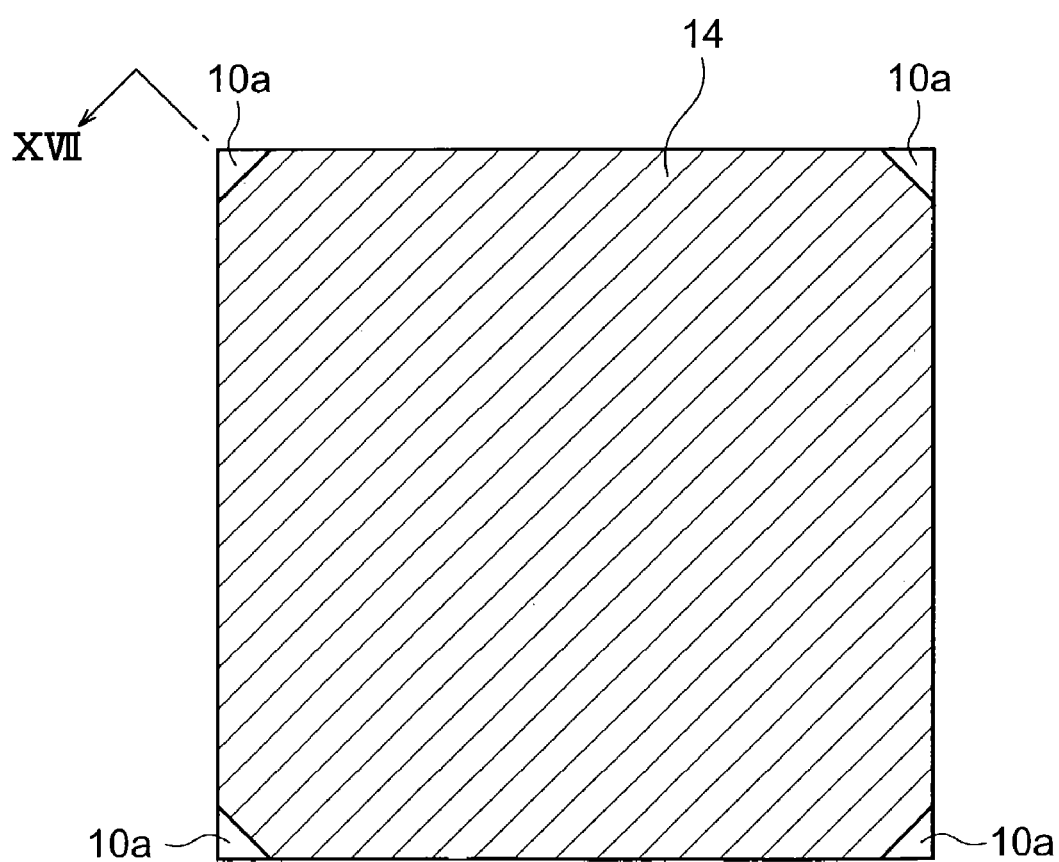
Figure 17:
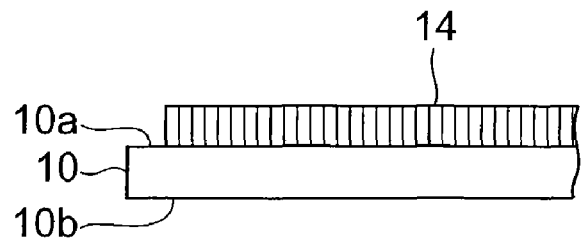

FIGS. 16 and 17 show a third modified scintillator panel according to the present invention. In this scintillator panel, the scintillator deposited region is surrounded four corner regions exposing the first surface 10a of the substrate 10. Each corner region has a triangular shape. These corners area are extremely smaller than the region on which the scintillator is deposited. These corner regions are used to hold the substrate 10 by the deposition holder in deposition chamber when the scintillator 14 is deposited on the substrate 10. When the first surface 10a has 30 mm×40 mm area, the length along the edge of each corner triangle area is not more than 1 mm.

Figure 18:
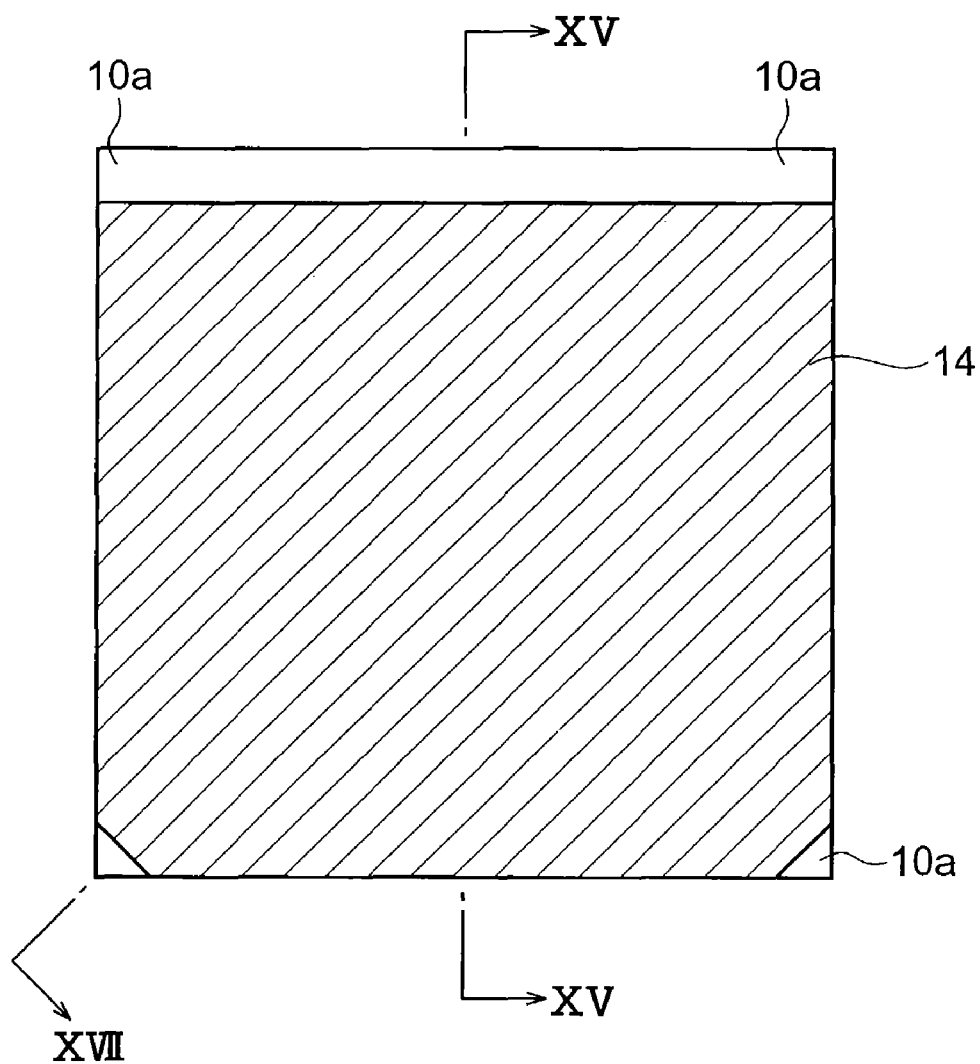
FIG. 18 shows further more modified Scintillator panel according to the present invention.

FIG. 18 shows a fourth modified scintillator panel according to the present invention. In this scintillator panel, the scintillator deposited region is surrounded one strip region and two corner regions on three sides. Each corner region is similar to that of the third modified scintillator panel and the strip region is similar to that of the first or second modified scintillator panels.

In each embodiment described above, the polyparaxylylene film 16 is formed on the entire surfaces of the substrate 10. However, the polyparaxylylene film 16 may be formed on a part of the surfaces of the substrate 10. For example, the polyparaxylylene film 16 may be formed on a part of the exposed surface of the substrate 10, having no scintillator thereon.

In each embodiment described above, the a-C substrate is used. However, a graphite substrate may be used. The graphite substrate has high radiation transmittance like the a-C substrate. In this case, therefore, the amount of radiation reaching the scintillator can be increased as in the case wherein the a-C substrate is used.

In the above embodiments, a LiF film is used as a thin transparent film. However, a film made of a material containing selected from the group consisting of LiF, $MgF_2$, $CaF_2$, $SiO_2$, $Al_2O_3$, MgO, NaCl, KBr, KCl, and AgCl may be used.

In each embodiment described above, CsI (Tl) is used as the scintillator 14. However, the present invention is not limited to this. For example, CsI (Na), NaI (Tl), Li (Eu), or KI(Tl) may be used.

In each embodiment described above, examples of the polyparaxylylene are polymonochloroparaxylylene, polydichloroparaxylylene, polytetrachloroparaxylylene, polyfluoroparaxylylene, polydimethylparaxylylene, and polydiethylparaxylylene.

According to the scintillator panel of the present invention, since the substrate made of carbon as a major constituent has high radiation transmittance, the amount of radiation absorbed by the substrate can be decreased, and the amount of radiation reaching the scintillator can be increased.

In addition, according to the radiation image sensor of the present invention, since the scintillator panel has the substrate made of carbon as a major constituent having high radiation transmittance, the amount of light reaching the image sensing element can be increased.

As described above, the scintillator panel and radiation image sensor of the present invention are suited for medical X-ray photography and the like.

The basic Japanese Application Nos. 171190/1998 filed on Jun. 18, 1998 and 171191/1998 filed on Jun. 18, 1998 are hereby incorporated by reference.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A scintillator panel comprising:
   a multi-sided substrate made of amorphous carbon;
   a scintillator formed so as to cover a substantial portion of a first side of the substrate, with at least one portion of the first side of the substrate being uncovered by the scintillator; and
   a protective film substantially covering all exposed surfaces of the substrate and the scintillator, including a second side of the substrate opposite the first side of the substrate as well as the portion of the first side of the substrate uncovered by the scintillator.

2. A scintillator panel according to claim 1, further comprising a reflecting film, wherein said reflecting film is disposed between a radiation emitting surface of said substrate and said scintillator.

3. A scintillator panel according to claim 2, wherein said reflecting film is a metal film.

4. A scintillator panel according to claim 2, wherein said reflecting film is a thin transparent film having a refractive index lower than a refractive index of said scintillator.

5. A scintillator panel according to claim 4, wherein said thin transparent film is a film made of a material containing a substance selected from the group consisting of LiF, $MgF_2$, $CaF_2$, $SiO_2$, $Al_2O_3$, MgO, NaCl, KBr, KCl, and AgCl.

6. A scintillator panel according to claim 1, wherein the portion of the first side of the substrate uncovered by the scintillator is located adjacent to an edge of the first side of the substrate.

7. A scintillator panel according to claim 1, wherein at least two portions of the first side of the substrate are uncovered by the scintillator and the protective film substantially covers the portions of the first side of the substrate uncovered by the scintillator.

8. A scintillator panel according to claim 7, wherein the portions of the first side of the substrate uncovered by the scintillator are located adjacent to different edges of the first side of the substrate.

9. A scintillator panel according to claim 7 wherein the portions of the first side of the substrate uncovered by the scintillator are located adjacent to opposing edges of the first side of the substrate.

10. A scintillator panel according to claim 1, wherein multiple portions of the first side of the substrate are uncovered by the scintillator and the protective film covers the portions of the first side of the substrate uncovered by the scintillator, the portions of the first side of the substrate uncovered by the scintillator are located adjacent to different edges of the first side of the substrate, and the sides of the substrate connecting the first side and the second side are covered by the protective film.

11. A scintillator panel according to claim 10, wherein the portions of the first side of the substrate uncovered by the scintillator are located adjacent to opposing edges of the first side of the substrate.

12. A scintillator panel according to claim 1, wherein said protective film further covers at least a part of said substrate.

13. A scintillator panel according to claim 12, wherein said protective film covers entire surfaces of said substrate.

14. A radiation image sensor comprising an image sensing element placed to oppose said scintillator of said scintillator panel defined in claim 1.

15. A scintillator panel comprising:
   a multi-sided substrate made of graphite;
   a scintillator formed so as to cover a substantial portion of a first side of the substrate, with at least one portion of the first side of the substrate being uncovered by the scintillator; and
   a protective film substantially covering all exposed surfaces of the substrate and the scintillator, including a second side of the substrate opposite the first side of the substrate as well as the portion of the first side of the substrate uncovered by the scintillator.

16. A scintillator panel according to claim 15, further comprising a reflecting film, wherein said reflecting film is disposed between a radiation emitting surface of said substrate and said scintillator.

17. A scintillator panel according to claim 16, wherein said reflecting film is a metal film.

18. A scintillator panel according to claim 16, wherein said reflecting film is a thin transparent film having a refractive index lower than a refractive index of said scintillator.

19. A scmtillator panel according to claim 18, wherein said thin transparent film is a film made of a material containing a substance selected from the group consisting of LiF, $MgF_2$, $CaF2$, $SiO_2$, $Al_2O_3$, MgO, NaCl, KBr, KCl, and AgCl.

20. A scintillator panel according to claim 15, wherein the portion of the first side of the substrate uncovered by the scintillator is located adjacent to an edge of the first side of the substrate.

21. A scintillator panel according to claim 15, wherein at least two portions of the first side of the substrate are uncovered by the scintillator and the protective film substantially covers the portions of the first side of the substrate uncovered by the scintillator.

22. A scintillator panel according to claim 21, wherein the portions of the first side of the substrate uncovered by the scintillator are located adjacent to different edges of the first side of the substrate.

23. A scintillator panel according to claim 21, wherein the portions of the first side of the substrate uncovered by the scintillator are located adjacent to opposing edges of the first side of the substrate.

24. A scintillator panel according to claim 15, wherein multiple portions of the first side of the substrate are uncovered by the scintillator and the protective film covers the portions of the first side of the substrate uncovered by the scintillator, the portions of the first side of the substrate uncovered by the scintillator are located adjacent to different edges of the first side of the substrate, and the sides of the substrate connecting the first side and the second side are covered by the protective film.

25. A scintillator panel according to claim 24, wherein the portions of the first side of the substrate uncovered by the scintillator are located adjacent to opposing edges of the first side of the substrate.

26. A scintillator panel according to claim 15, wherein said protective film further covers at least a part of said substrate.

27. A scintillator panel according to claim 26, wherein said protective film covers entire surfaces of said substrate.

28. A radiation image sensor comprising an image sensing element placed to oppose said scintillator of said scintillator panel defined in claim 15.

* * * * *

UNITED STATES PATENT AND TRADEMARK OFFICE
CERTIFICATE OF CORRECTION

PATENT NO. : 7,112,801 B2
APPLICATION NO. : 10/629820
DATED : January 9, 2007
INVENTOR(S) : Takuya Homme et al.

It is certified that error appears in the above-identified patent and that said Letters Patent is hereby corrected as shown below:

Item (30), on the Title page of the patent, delete:

"(30)    Foreign Application Priority Data

Jun. 18, 1998    (JP)    11-171190

Jun. 18, 1998    (JP)    11-171191"

and insert the following:

Item
--(30)    Foreign Application Priority Data

Jun. 18, 1998    (JP)    P1998-171190

Jun. 18, 1998    (JP)    P1998-171191--

Signed and Sealed this

Sixth Day of March, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,112,801 B2 | Page 1 of 1 |
| APPLICATION NO. | : 10/629820 | |
| DATED | : September 26, 2006 | |
| INVENTOR(S) | : Takuya Homme et al. | |

It is certified that error appears in the above-identified patent and that said Letters Patent is hereby corrected as shown below:

Item (30), on the Title page of the patent, delete:

"(30)   Foreign Application Priority Data

Jun. 18, 1998   (JP)     11-171190

Jun. 18, 1998   (JP)     11-171191"

and insert the following:

Item
--(30)   Foreign Application Priority Data

Jun. 18, 1998   (JP)    P1998-171190

Jun. 18, 1998   (JP)    P1998-171191--

This certificate supersedes Certificate of Correction issued March 6, 2007.

Signed and Sealed this

Twenty-seventh Day of March, 2007

JON W. DUDAS
*Director of the United States Patent and Trademark Office*